United States Patent Office 3,711,425
Patented Jan. 16, 1973

---

3,711,425
FLUORIDED METAL ALUMINA CATALYSTS
Robert M. Suggitt and John H. Estes, Wappingers Falls, and Stanley Kravitz, Wiccopee, N.Y., assignors to Texaco Inc., New York, N.Y.
No Drawing. Filed June 25, 1970, Ser. No. 60,954
Int. Cl. B01j *11/74, 11/78*
U.S. Cl. 252—439                                                 11 Claims

ABSTRACT OF THE DISCLOSURE

A method for preparing a hydrocarbon conversion catalyst by providing a composite composed of alumina having associated therewith a Group VI–B or VIII metal or compound and contacting the composite with an activator system comprising oxygen and an organic fluoride compound having from 2 to 16 carbon atoms. The catalyst so prepared is useful in hydrocarbon conversion processes as isomerization, hydrocracking, reforming, dehydrogenation, disproportionation and polymerization.

---

BACKGROUND OF THE INVENTION

This invention relates to the preparation of fluorine containing catalysts and to their use in low temperature hydrocarbon conversion processes. In one of its specific aspects, this invention relates to a method of preparing a catalyst comprising a member Group VI–B or VIII of the Periodic Table, alumina and fluorine which is suitable for the conversion of hydrocarbons.

Fluorided catalysts are of interest for various processes including isomerization, reforming, alkylation, hydrogenation, disproportionation, cracking, polymerization and hydrocracking. Heretofore, activation of catalyst bases or composites by fluoriding was undertaken employing aqueous hydrogen fluoride or vaporized boron or ammonium fluorides. Such fluoriding techniques however, by virtue of the fluoriding materials employed introduced various problems not the least of which included health, handling and equipment corrosion. In some instances, unwanted surface deposits resulted from the treatment which interferred with the catalyst's ability to function. Moreover, such fluoriding techniques did not lend themselves to the replacement of fluorine lost during high temperature regeneration.

It is therefore an object of this invention to provide a method for catalytically activating a composite material employing as a component of the activator system a multicarbon fluoro compound that introduces no equipment corrosion problems.

Another object of this invention is to provide a method for fluoriding catalysts with an agent that is physiologically inert.

Still another object of this invention is to provide a hydrocarbon conversion process undertaken in the presence of a catalyst prepared or regenerated in situ under noncorrosive conditions in a hydrocarbon conversion reactor.

Other objects and advantages will become apparent from a reading of the following detailed description and examples.

SUMMARY OF THE INVENTION

Broadly, this invention contemplates a method of preparing a catalyst comprising a hydrogenating component, alumina and about 0. to 15.0 weight percent fluorine which comprises contacting alumina having associated therewith a hydrogenating component selected from the group consisting of metals of Groups VI–B and VIII of the Periodic Table, their compounds and mixtures thereof with a combination of oxygen and an organic fluoride compound containing from 2 to 16 carbon atoms at a temperature of from about 450 to 900° F., where said oxygen is present in an amount of at least one gram mole of oxygen per gram atom of carbon in said fluoride compound.

According to our invention, catalytically active fluorided catalysts can be prepared employing an organic fluoride compound corresponding to the general formula:

where X is nitrogen or oxygen and where $n$ is 2 to 16, $a$ is 1 to $2n+m$, $b$ is 0 to $2n+m-1$ and $c$ is 0 to 1. The value of $m$ is equal to 2 when $c$ equals zero or when X is oxygen and $m$ is equal to 3 when X is nitrogen. In our preferred embodiment X is nitrogen or oxygen and $c$ is 1. Compounds contemplated as members of the activator system include difluoroethane, hexafluoroethane, octafluoropropane, 1-fluoro-2-methylpropane, decafluorodiethylether, hexafluorobenzene and tritriacontafluororevadecyl amine. Preferred compounds are hexafluoroacetone, hexadecafluoropropyloxa cyclohexane ($C_5F_9OC_3F_7$) and heptacosafluorotributylamine.

According to our invention, catalytically active fluoride catalysts are prepared employing a combination of oxygen and the aforementioned fluoride compounds. A composite containing alumina and about 0.01 to 30.0 weight percent of a hydrogenating component is simultaneously contacted with oxygen and the fluoride activating agent as hereinabove described to introduce within the range of about 0.5 to 15 weight percent fluorine onto the catalyst.

As mentioned above, the highly active hydrocarbon conversion catalysts contemplated herein are prepared from an alumina composite activated with a combination of oxygen and the fluoride compound. Associated with the alumina as a component of the composite is a member of Group VI–B or VIII of the Periodic Table exemplified by chromium, molybdenum, tungsten, cobalt, nickel, platinum, palladium, ruthenium and rhodium. Combinations of metals are also contemplated such as nickel-tungsten and cobalt-molybdenum. The member may be present on the catalyst as metal or as a compound such as the oxide, sulfide or salt such as the sulfate. In general, the catalyst may contain a member of Groups VI–B and VIII in amounts of from 0.01 to 30 weight percent calculated as weight of metal. When Group VIII members such as platinum, palladium, rhodium and ruthenium are present as components, we employ amounts of from 0.1 to 2.0 weight percent based on the catalyst. Combinations of metals such as nickel and tungsten are employed in greater amounts as for example 20 to 30 weight percent.

Aluminas in various forms may be used in this invention and particularly those aluminas having replaceable surface hydroxyl groups and surface areas of 50 to 800 square meters per gram using the BET method. Included within our definition of alumina, we mention, for example, eta-alumina, gamma-alumina, silica-stabilized alumina, i.e., aluminas containing approximately 5 weight percent $SiO_2$, thoria-alumina, zirconia-alumina, titania-alumina, and chromia-alumina. Also contemplated are silica-aluminas having surface areas of from 100 to 600 square meters per gram and alumino-silicates having surface areas of from 600 to 800 square meters per gram. Preferably, we employ alumina having surface areas of from 50 to 400 square meters per gram and particularly eta and gamma-alumina. Suitable composites contemplated for contacting with our fluoriding system include commercially available materials including platinum-alumina reforming catalysts. The metal alumina composites may also be prepared by techniques well known to the art. Illustratively, a metal such as platinum is provided to the composite by impregnating active alumina with an aqueous solution of chloroplatinic acid and ethylene diamine followed by drying and calcining at about 1050° F. for 2 hours thereby providing a platinized alumina composite. Where palladium is contemplated, it may similarly be introduced by providing a palladium tetramine complex as by dissolving palladium chloride in hydrochloric acid, diluting with water and concentrated ammonium hydroxide followed by heating at 140° F. with stirring for about 30 minutes until the precipitate originally formed is dissolved. The resulting solution is cooled and added to the alumina and after thorough mixing the alumina is dried at about 300° F. and thereafter calcined at elevated temperatures of from 800 to 1200° F. for periods of at least 2 hours. Group VI-B and other Group VIII members such as rhodium and ruthenium are provided to the composite in essentially the same manner by impregnation with soluable salts of these metals followed by calcination at 600 to 1200° F. for several hours.

In accordance with our invention, a composite as hereinabove defined is contacted with a combination of oxygen and the aforementioned fluoride compound to introduce to the final catalyst about 0.5 to 15, preferably 0.5 to 6.0, weight percent chemically combined fluorine. Fluoriding in accordance with this invention enhances the acidity of the treated composite thereby promoting the catalyst's activity and improving its selectivity. Moreover, fluoriding provides the catalyst with activity at lower temperatures where the unfluorided composite would be inactive.

The ratio of oxygen to fluoride compound during the contacting stage ranges from at least 1 and up to 50 gram moles of oxygen per gram atom of carbon in said fluoride compound and preferably 2 to 10 gram moles of oxygen per gram atom of carbon in said fluoride compound. Ratios of oxygen less than 1 gram mole are unsatisfactory in that interaction between the alumina and activator system proceeds at a slower rate leading to incomplete activation. Also, oxygen in an amount of at least one gram mole per gram atom of carbon in said fluoride compound permits activation to be undertaken in the absence of deleterious carbonaceous deposit formation on the catalyst surface. In the stoichiometry of the activation reaction, we postulate that the fluoride activating agent reacts with the alumina's surface hydroxyl groups to introduce fluorine with the elimination of water and carbon dioxide or carbon monoxide. Ratios above 50 are unnecessary because this greatly exceeds the optimum requirements of oxygen consumption. The activating combination of oxygen and fluoride compound may be introduced to the composite separately or as mixed streams and the activator components are permitted to flow through and over the composite. During contacting, the composite is maintained at a temperature of from 450 to 900° F. and preferably at a temperature of from about 500 to 700° F. Depending on the activating temperature employed and the weight percent fluorine to be introduced to the composite, contact times ranging from 2 to 7 hours are employed. In view of the non-corrosive nature of the fluoride compounds herein of the non-corrosive nature of the fluoride compounds herein employed, the catalyst can be prepared in situ in a hydrocarbon conversion reactor by passing a stream of oxygen and the fluoride compound to the vessel directly containing the composite. The effluent from the reactor during activation contains water and carbon monoxide or carbon dioxide.

As contemplated herein, the inventive concept includes both initial activation and subsequent regeneration of the fluorided catalysts. It will be appreciated that during the course of hydrocarbon conversion feedstocks employed may in some instances contain materials such as combined nitrogen in amounts exceeding 30 p.p.m. or such other materials as arsenic, antimony or other known poisons such as alkali or alkaline earth metals which in the course of operation cause the catalyst to become deactivated. To rejuvenate catalyst activity the deactivating materials are removed from the catalyst where they form volatile fluorides by contacting with the combination of oxygen and fluoride compound in a manner described above.

The catalyst prepared by our invention can be produced in pellet, granular, bead or perverulent form to facilitate its use in fixed beds, moving beds or fluidized solid beds as is well known in the art. During the course of catalyst activation or regeneration, the effluent from the hydrocarbon conversion reactor consists largely of water, carbon dioxide and unconverted fluoride compound and oxygen. Any unconverted fluoride compound and excess oxygen may be recycled.

The catalyst prepared herein is highly active for hydrocarbon conversion at relatively low temperatures of from 200 to 1000° F. and finds application in a broad spectrum of conversion processes including hydrocracking, selective hydrocracking, hydroisomerization, disproportionation, alkylation, polymerization, reforming and hydrogenation. In general, the hydrocarbon feedstocks contain less than 30 p.p.m. nitrogen and are converted in the presence of our catalyst at temperatures recited above.

Catalysts prepared according to our invention are admirably suited to convert a wide range of hydrocarbon materials. Illustratively, fluorided platinized aluminas are highly active for hydrocracking and hydroisomerizing such charge materials as waxes, slack wax and middle distillate oils at temperatures of 500 to 800° F. at pressures of 300 to 750 pounds per square inch gauge, liquid hourly space velocities of 1 to 20 and in the presence of hydrogen. In general, catalysts containing lower fluorine contents require the higher conversion temperatures for equivalent rates of reaction. Selectivity for isomerization of normal $C_4$ to $C_6$ paraffins is improved at the lower temperatures. Aromatics can be hydrogenated and lubricating oil fractions can be modified to improve viscosity index pour point. The catalysts are active for alkylation of aromatics and aliphatics and polymerization of olefins at temperatures of 200 to 400° F. and pressures of 300 to 800 p.s.i.g. The fluorided catalysts are active for hydrocarbon conversions at considerably lower temperatures than the non-fluorided composite. For example, fluorided platinized alumina permits isomerization of $C_4$ to $C_6$ n-paraffins at 600° F. whereas the non-fluorided composite is inactive at temperatures below 800° F.

In order to more fully illustrate the nature of our invention and manner of practicing the same, the following examples are presented. In these examples, the best mode contemplated by us for carrying out our invention is set forth.

EXAMPLE I 1000 cc. of commercially available 0.6 weight percent platinum on eta-alumina were mixed with 50 grams of heptacosafluorotributylamine and charged to a pressure reactor. The reactor was pressurized to 100 p.s.i.g. with oxygen and heated to a temperature of 550° F. The system was held at this temperature for one hour and a maximum pressure of 250 p.s.i.g. was recorded. Upon analysis the product was found to contain 3.8 weight percent chemically combined fluorine.

EXAMPLE II 650 cc. of a commercial reforming catalyst having 0.38 weight percent platinum on gamma-alumina was mixed with 26 cc. of heptacosafluorotributylamine and charged to a pressure reactor. Oxygen was introduced to the reactor to a pressure of 100 p.s.i.g. and a reactor was heated to 550° F. for one hour. A maximum pressure of 165 p.s.i.g. was developed during this period in a reactor having a volume of approximately 3000 cc. Upon analysis, the product was found to contain 4.3 weight percent chemically combined fluorine.

EXAMPLE III 640 cc. of a commercially available 0.47 weight percent platinum on eta-alumina composite was mixed with 40 grams of heptacosafluorotributylamine and charged to a pressure reactor. Oxygen was introduced to the reactor until the pressure reached 100 p.s.i.g. Thereafter, the reactor was heated to 500° F. for a period of one hour wherein the reactor reached a maximum pressure of 200 p.s.i.g. Upon analysis, the final catalyst had a fluorine content of 3.7 weight percent.

EXAMPLE IV

The catalysts of Examples I to III were employed to isomerize a wax, to maximize oil yields at the expense of as little cracked product as possible. The properties of the charge stock are summarized in Table I.

TABLE I

Charge stock wax

| | |
|---|---|
| API gravity | 39.1 |
| Specific gravity 60/60 | 0.8285 |
| Melting point ° F. | 136.4 |
| Oil content weight percent | 7.3 |
| Percent S, less than | 0.051 |
| Nitrogen, less than | 0.10 |
| n-Paraffin, percent | 53 |
| Molecular weight average | 408 |

The catalyst of Example I was employed to isomerize the wax composition above at temperatures of from 575 to 675° F. Table II summarizes the conditions employed and the resulting products.

TABLE II

| Reactor temperature | 575 | 600 | 625 | 675 |
|---|---|---|---|---|
| Reactor pressure, p.s.i.g | 1,000 | 500 | 500 | 500 |
| LHSV | 1.05 | 1.09 | 1.04 | 1.05 |
| $H_2$ rate s.c.f.b | 4,800 | 5,000 | 4,700 | 4,800 |
| Yields wt. percent: | | | | |
| Liquid product | 97.7 | 99.1 | 99.6 | 96.5 |
| Stabilized product: | | | | |
| Basis liquid produced | 99.6 | 97.0 | 94.9 | 46.8 |
| Basis wax charged | 97.3 | 96.1 | 94.5 | 45.2 |
| Cracking loss | 2.7 | 3.9 | 5.5 | 54.8 |
| Stabilized product: | | | | |
| Melting point SP-78° F | 135.2 | 127.3 | 124.7 | 81.5 |
| Oil content from melting point | 8 | 22 | 30 | 87 |
| Oil content from dewaxing | | | | 86.6 |

The following data described the activity of the catalyst prepared in Example II.

TABLE III

| Reactor temperature | 625 | 650 | 675 |
|---|---|---|---|
| Reactor pressure, p.s.i.g | 500 | 500 | 50g |
| LHSV | 0.97 | 1.03 | 1.00 |
| $H_2$ rate s.c.f.b | 5,200 | 4,900 | 4,800 |
| Yields wt. percent: Liquid product | 96.0 | 95.5 | 88.8 |
| Stabilized product: | | | |
| Basis liquid produced | 97.7 | 94.6 | 68.1 |
| Basis wax charged | 93.8 | 90.3 | 60.1 |
| Cracking loss | 6.2 | 9.7 | 39.9 |
| Melting point SP-78° F | 131.5 | 120.7 | 108.5 |
| Oil content from melting point | 13 | 42 | 66 |
| Oil content from dewaxing | | 36.9 | 64.1 |
| Oil formation from oil content from melting point | 4 | 33 | 35 |
| Oil formation from oil content from dewaxing | | 27.3 | 32.9 |

The catalyst of Example III was evaluated as follows:

TABLE IV

| Reactor temperature | 650 | 675 | 700 |
|---|---|---|---|
| Reactor pressure | 500 | 500 | 500 |
| LHSV | 2.5 | 2.5 | 2.5 |
| $H_2$ rate | 4,300 | 4,300 | 4,300 |
| Yields wt. percent: | | | |
| Liquid product | 28 | 47 | 47 |
| Cracking loss | 12 | 22 | 37 |

As can be seen from the data tabulated above, the catalysts prepared in Examples I through III possess substantial activity for wax isomerization to convert a wax charge stock to more liquid products having potential as lubricating oil stocks.

From the foregoing, it can be seen that we have provided a significantly useful process for the preparation of a catalyst useful in the conversion of hydrocarbons. Our process can be performed in situ, i.e., within the hydrocarbon conversion reactor and does not necessitate withdrawal of catalyst from a vessel for transfer to the hydrocarbon conversion reactor with the attendant problem of subjecting the catalyst to moisture. In addition, our process can be performed to regenerate a spent catalyst by first heating the spent catalyst to decarbonize the catalyst and then treating in the manner of our invention. Our catalyst can contain any one of the aforementioned metals, for example, platinum, palladium, ruthenium, and rhodium depending upon the choice of the particular operator and the availability of the metal. The activation of the catalyst bases containing any of these metals proceeds essentially in the same way of activation of alumina base catalyst containing another metal of the group Thus, the manipulative procedure did not substantially vary from one metal to the other.

The terms and expressions which have been used herein are terms of description and not of limitation as there is no intention in the use of such terms and expressions of excluding any equivalents of the features shown and described or portions thereof, as it is recognized that various modifications are possible within the scope of the invention. In addition to the specific hydrocarbons employed in the examples, other hydrocarbons can be isomerized and our process can be used in other hydrocarbon conversion processes.

We claim:

1. A method of preparing a catalyst comprising a hydrogenating component, alumina and about 0.5 to 15.0 weight percent fluorine which comprises contacting alumina having associated therewith a hydrogenating component selected from the group consisting of the metals, oxides, sulfides and salts of the metals of Groups VI–B and VIII of the Periodic Table and mixtures thereof with a combination of oxygen and an organic fluoride compound containing from 2 to 16 carbon atoms corresponding to the formula $C_nF_aH_bX_c$ where X is nitrogen and where $n$ is 2 to 16, $a$ is 1 to $2n+m$, $b$ is 0 to $2n+m-1$ and $c$ is 1, where $m$ is equal to 3, at a temperature of from about 450 to 900° F., where said oxygen is present in an amount of at least one and up to 50 gram moles of oxygen per gram atom of carbon in said fluoride compound.

2. A method according to claim 1 wherein said hydrogenating component is present in said catalyst in an amount of from 0.01 to 30.0 weight percent calculated as weight of metal.

3. A method according to claim 1 wherein said component is selected from the group consisting of platinum, palladium, ruthenium, rhodium, nickel, cobalt, molybdenum, chromium and tungsten.

4. A method according to claim 1 wherein said component is selected from the group consisting of platinum, palladium, rhodium and ruthenium and where said component is present in said catalyst in an amount of from 0.1 to 2.0 weight percent.

5. A method according to claim 1 wherein said organic fluoride compound is heptacosafluorotributylamine.

6. A method according to claim 1 wherein the ratio of oxygen to said fluoride compound is 2 to 10 gram moles of oxygen per gram atom of carbon in said fluoride compound.

7. A method according to claim 1 wherein said temperature is from 500 to 700° F.

8. A method according to claim 1 wherein said fluorine is present in an amount of from 0.5 to 6.0 weight percent.

9. A method according to claim 1 wherein said alumina is eta-alumina.

10. A method according to claim 1 wherein said alumina is gamma-alumina.

11. A method according to claim 1 wherein said alumina has a surface area of from 50 to 400 square meters per gram.

References Cited

UNITED STATES PATENTS

| | | | |
|---|---|---|---|
| 3,338,843 | 8/1967 | Goble et al. | 252—442 |
| 3,248,449 | 4/1966 | Goble et al. | 252—442 X |
| 3,424,697 | 1/1969 | Notari et al. | 252—442 X |
| 3,553,281 | 1/1971 | Goble et al. | 252—442 X |
| 3,555,107 | 1/1971 | Estes et al. | 252—441 X |
| 3,138,559 | 6/1964 | Hauptschein et al. | 252—441 X |

PATRICK P. GARVIN, Primary Examiner

U.S. Cl. X.R.

208—27, 112, 136, 137, 139; 252—441, 442